June 13, 1967  F. M. IRVING, JR., ETAL  3,325,025
CONTROLLED VACUUM BREAD AND BUN DEPANNER
Filed Jan. 14, 1966  4 Sheets-Sheet 4

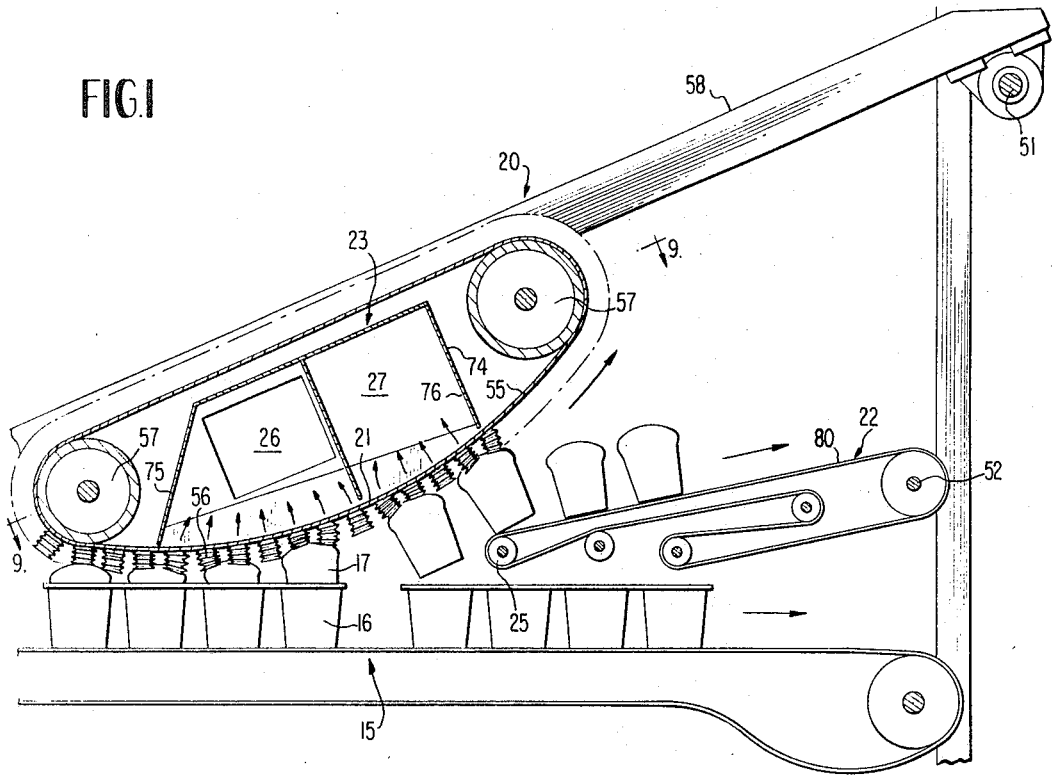
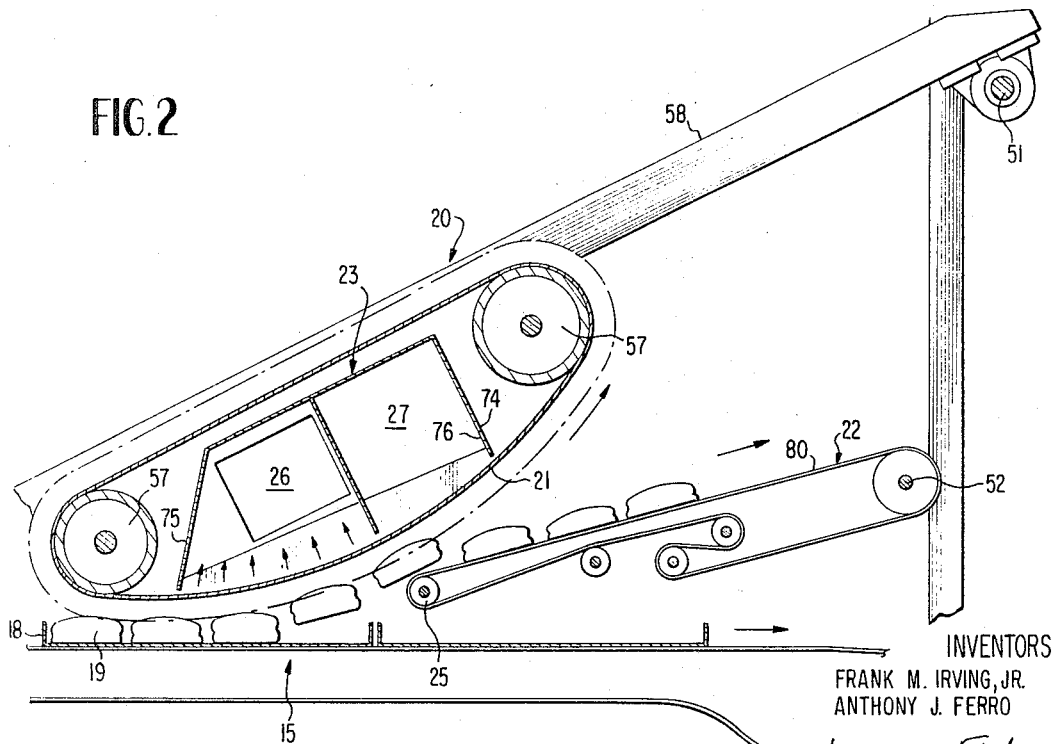

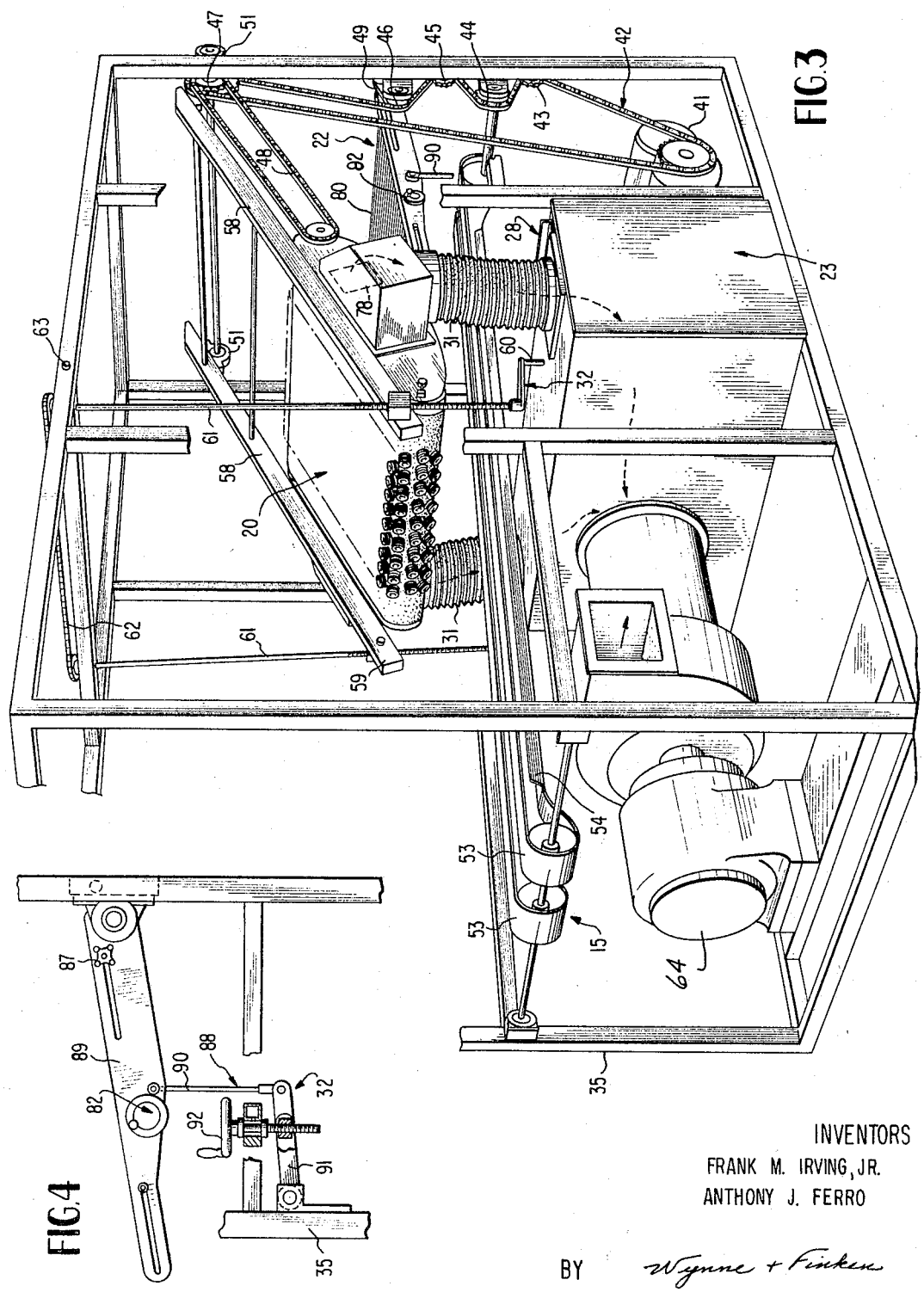

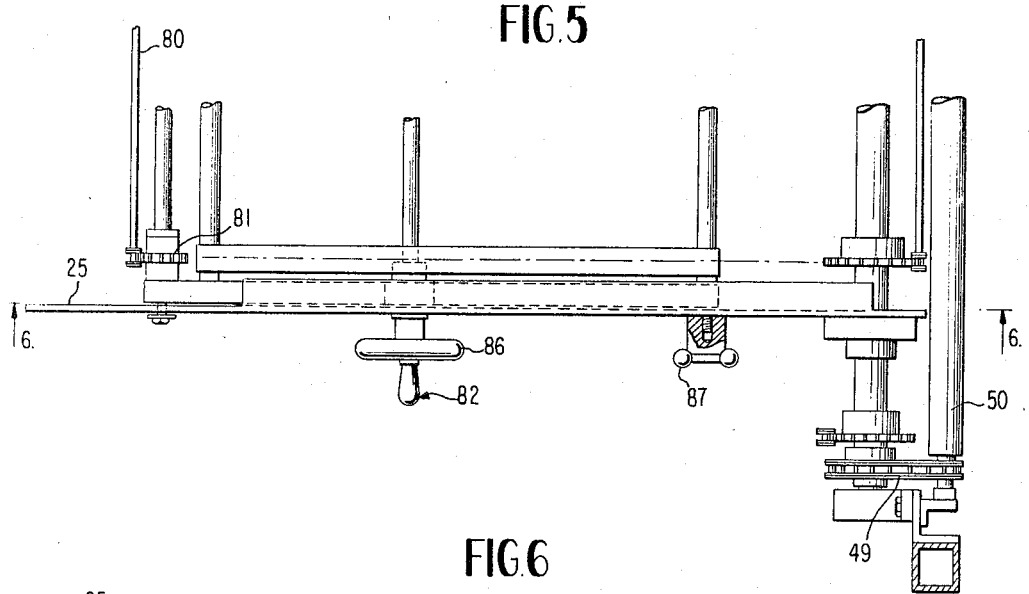
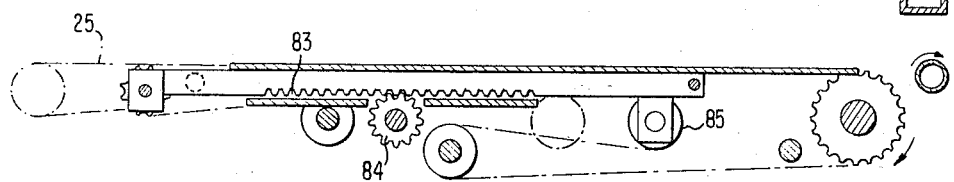
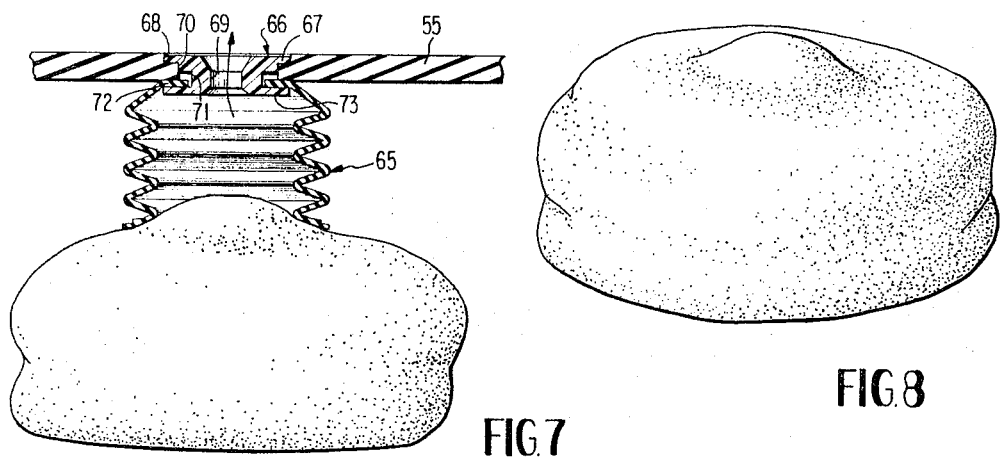

INVENTORS
FRANK M. IRVING, JR.
ANTHONY J. FERRO

BY  *Wynne + Finken*
ATTORNEYS

United States Patent Office 3,325,025
Patented June 13, 1967

3,325,025
CONTROLLED VACUUM BREAD AND BUN DEPANNER
Frank M. Irving, Jr., and Anthony J. Ferro, York, Pa., assignors to Alto Company, York, Pa., a partnership
Filed Jan. 14, 1966, Ser. No. 520,749
10 Claims. (Cl. 214—309)

This invention relates to a suction device for removing articles from containers. Specifically, this invention is directed to an apparatus which can, through suitable adjustments, vacuum depan bakery products of varying heights and delicacy.

This invention provides a vacuum depanner which has an adjustable lifting zone so that tall bread loaves with durable crusts can be lifted by vacuum along the entire length of the lifting zone while bakery products of a more delicate nature can be lifted by vacuum along a shorter length of the lifting zone. This reduction of exposure of the delicate bakery product, such as rolls, to suction forces effectively reduces the damage and possibility of damage. Combination machines employing bellows vacuum cups are an example of the type of machine which can deform rolls; extended exposure of the top of a roll to the circular suction pattern produced by the cup forms an upstanding dome on the roll. In some cases, fracture of the crust takes place along with deformation. The result is an increase in sub-standard rolls or "cripples." Success in the baking business demands a low "cripple" percentage. The instant invention is directed toward a reduction of this percentage.

The apparatus includes a feed conveyor for panned bakery products, a suction pickup conveyor for removing the loaves or rolls from the pans, and a discharge conveyor for receiving the depanned products. Vacuum control means are provided for reducing the effective longitudinal lifting length of the lifting zone; and, in combination therewith, the discharge conveyor is probe-like and through positioning means can be extended or retracted to coordinate with the variation in effective lifting length. Further, in handling rolls, which have a lower profile than loaves and are of greater delicacy, the apparatus includes adjusting means for changing the vertical orientation of the conveyors. Preferably the pickup conveyor and discharge conveyor are pivotally mounted at a downstream location so that they can be swung downwardly through small arcs for roll depanning. Further, the preferred combination includes a unique drive system having a chain-like drive means operatively connected to the pickup conveyor and discharge conveyor at their pivotal mountings to enable adjustments of their vertical orientation without affecting the synchronization and setting of their drive means.

These and further objects and advantages of the present invention will become more apparent upon reference to the following specification, appended claims and drawings wherein:

FIG. 1 is a schematic view of the apparatus adjusted for depanning loaves of bread;

FIG. 2 is a schematic view similar to FIG. 1 arranged for depanning rolls;

FIG. 3 is a perspective view of the apparatus showing the important elements thereof somewhat schematically and showing the chain-like drive means for the unit;

FIG. 4 is a side view of the adjusting means for the discharge conveyor;

FIG. 5 is a top view of a side portion of the discharge conveyor;

FIG. 6 is a side view of the discharge conveyor portion of FIG. 5, showing the positioning means for extension and retraction thereof;

FIG. 7 is an enlarged side view in cross section of a portion of a preferred pickup conveyor and suction aperture formed by a bellows suction cup;

FIG. 8 is a perspective view of a roll showing an upstanding dome of the type formed by extended exposure to the suction of the suction cup;

Figure 9:
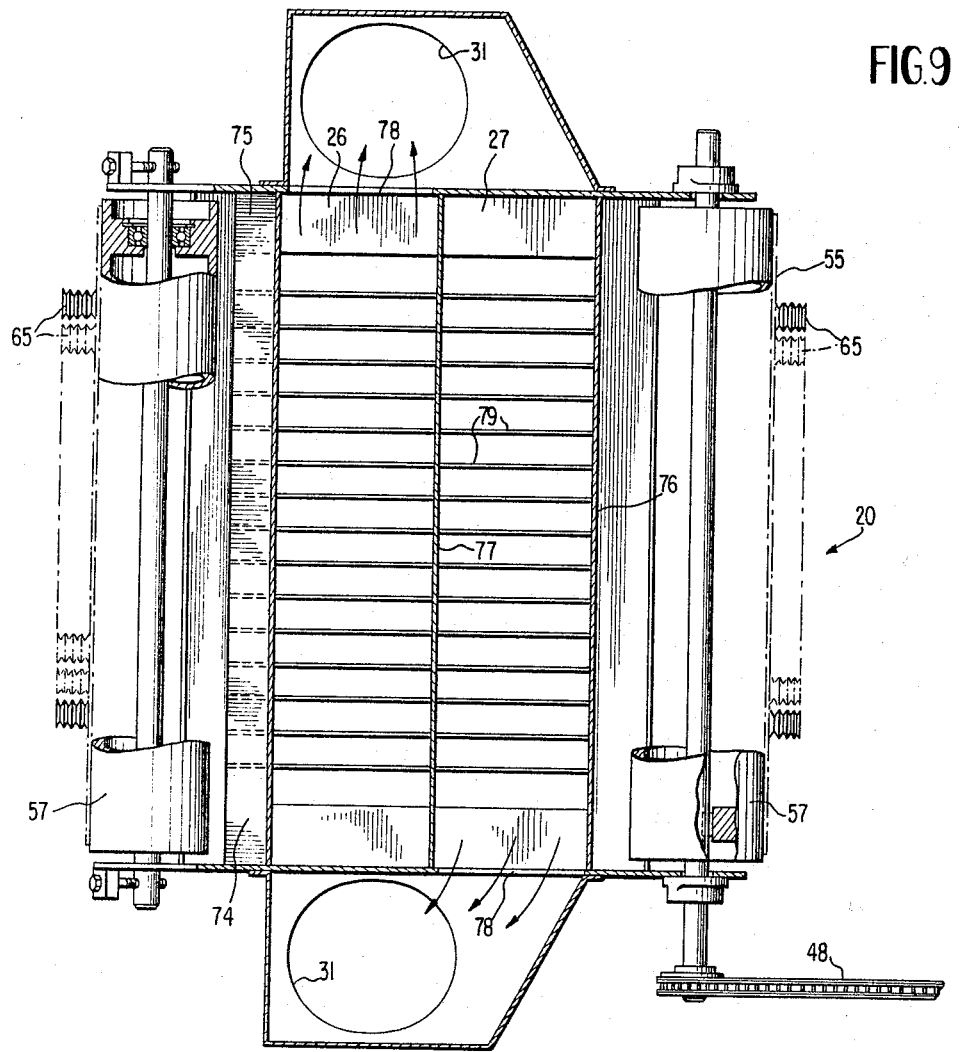
FIG. 9 is a cross sectional view taken on line 9—9 of FIG. 1.

Referring now to FIGS. 1 and 2, it will be seen that the feed conveyor 15 extends horizontally and feeds pans 16 of bread loaves 17 (FIG. 1) or pans 18 of rolls 19 (FIG. 2) to the pickup conveyor 20. The pickup conveyor 20 has a convex upwardly inclined lower flight 21 designed to smoothly engage the bakery product with a very slightly downward and substantially horizontal movement followed by the arcuate upward lifting of the product into dropping alignment with a discharge conveyor 22. The pans 16 and 18 travel horizontally beneath the discharge conveyor 22. The depanned bakery products and their pans may then be transferred to further conveyor systems for further handling.

The pickup conveyor 20 includes vacuum means 23 which produces a suction along a length of the lower flight 21 which in turn defines a lifting zone or a product handling run of a predetermined maximum effective lifting length extending from an upstream pickup station to a variable downstream discharge station. Bread pans 16 require the upstream end 25 of the discharge conveyor 22 to be four or more inches above the feed conveyor 15, this leaving, as seen in FIG. 1, a substantially similar dimension for passage of the depanned bread to the discharge conveyor 22. When rolls are depanned, a space of about 2 inches is required for passage of the roll pan 18 and a similar reduced space is required for passage of the rolls, as seen in FIG. 2.

Figure 10:
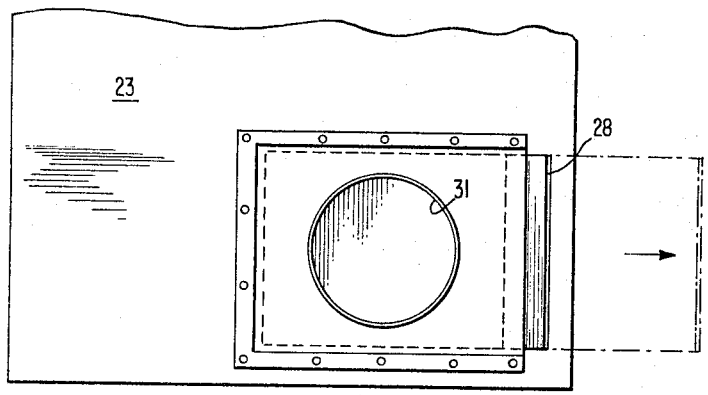
FIG. 10 is a top view of the valve in the vacuum means with its open position shown in dotted lines.

Arrows indicate suction or air flow in FIG. 1 into both the upstream section 26 and the downstream section 27 of the vacuum means 23. In FIG. 2 only the upstream section 26 is used as shown by the arrows, the downstream section 27 being shut off by the vacuum control means 28 shown in FIGS. 3 and 10 in the form of a sliding plate valve in the vacuum conduit 31 to the downstream section 27.

Adjusting means 32 and 32 (FIGS. 3 and 4) is provided for adjusting the vertical orientation of the three conveyors 15, 20 and 22 relative to each other to accommodate products of different heights.

Preferably, the feed conveyor 15 is mounted in a fixed non-adjustable horizontal position on a framework 35 (FIG. 3) and the pickup conveyor 20 and discharge conveyor 22 are pivotally mounted downstream of the lifting zone for arcuate movement of their upstream ends.

FIG. 3 shows the general arrangement and the drive system for the conveyors. A single power means 41, which includes an electric motor and an adjustable transmission and clutch unit, powers a positive chain-like drive means 42 which passes over idler 43 to the feed conveyor sprocket 44, over idler 45 to the discharge conveyor sprocket 46 and then to the pickup conveyor sprocket 47. The pickup conveyor drive has a pickup drive line 48 extending upstream from the sprocket 47 to drive downstream roller 57. A secondary line 49 (FIG. 5) at the discharge conveyor sprocket 46 drives a rod 50 which aids in product discharge. When the pickup conveyor 20 and discharge conveyor 22 are arcuately adjusted by the adjusting means 32 and 32, no adjustment of the drive means 42 is required; synchronization of all belts is accurately maintained since the chain-like drive means 42 engages sprockets at the first pivotal mounting means 51 for the pickup conveyor and the second pivotal mounting means 52 for the discharge conveyor 22.

The feed conveyor 15 includes two horizontally spaced longitudinally extending endless linked metal plate belts 53, the lower flights of which are supported for guided return by guides 54.

The pickup conveyor 20 includes an endless belt 55 having suction apertures 56 therethrough and, in the preferred modification shown, these suction apertures 56 are formed by suction cups 65 having a bellows wall (FIG. 7). The vacuum means 23 within the belt 55 provides the suction along a predetermined length of the lower flight, thereby defining the lift zone, the effective longitudinal lifting length of this zone being regulated by means of valve 28 which shuts off the suction to the downstream section 27 and provides suction only at the upstream section 26. The belt 55 and its rollers 57, 57 are supported on side arms 58, 58 which extend upwardly and downstream to the first pivotal mounting means 51. The adjusting means 32, FIG. 3, is attached to the upstream end 59 of the pickup conveyor and by turning handle 60 the upstream end 59 is moved in an arcuate path upwardly and downwardly, the handle 60 turning the threaded shafts 61, 61 simultaneously through a top chain drive connection 62 and the threaded shafts being mounted to pivot on rod 63 mounted in the top of the frame 35.

The vacuum means 23 includes a flexible bellows-type conduit 31 at each side connecting the portion of the vacuum means 23 in the pickup conveyor with the motor and blower system 64 mounted in the bottom of the upstream end of the frame 35.

As seen in FIG. 7, the pickup conveyor 20 includes the endless flat solid belt 55 and the suction apertures 56 therethrough are formed by bellows suction cups 65 mounted on the belt 55 by a cylindrical adapter 66 which has an inner flange 67 seated in a countersunk seat 68 formed on the inner surface of the belt. The adapter has an intermediate body 69 which includes an inner bearing portion 70 for rigidifying its connection with the belt and an undercut portion 71 for accommodating the inner member 72 of the suction cup 65 which is sandwiched between the outer flange 73 of the adapter 66 and the outer face of the belt 55. This assembly facilitates removal and cleaning of the bellows cups 65.

The portion of the vacuum means 23 (FIGS. 1 and 9) in the pickup conveyor 20 includes the housing 74 having an upstream plate 75 and a downstream plate 76 which extend transversely and define the maximum effective lifting length of the lifting zone. A central plate 77 divides the housing 74 into the upstream section 26 and the downstream section 27, each section having its own outlets 78 and flexible conduit 31 at opposite sides of the housing. The open bottom of the housing has transversely spaced, longitudinally extending vanes 79 for engaging the inner face of the belt 55 as seen in FIG. 9, throughout the lifting zone. Closing valve 28 shuts off the suction to the downstream section 27.

The discharge conveyor 22 includes a transverse rod belt 80 having side chains 81 (FIGS. 3–6). Positioning means 82 enables the positioning of its upstream end 25 at various longitudinal locations along the lifting zone. This positioning adjustment is made to coordinate with the effective longitudinal lifting length of the lifting zone as established by the vacuum control means 28. FIGS. 4–6 show the positioning means 82 as including a rack 83 and pinion 84 with handwheel 86 for extending and retracting the vertically narrow upstream end 25, the compensating sprocket 85 moving with the rack 83 to accommodate this movement. The upstream end 25 is shown in a retracted position in FIG. 6 with phantom lines showing an extended position thereof and of the compensating sprocket 85. Wheel 87 locks the upstream end 25 in place.

The adjusting means 32 for the discharge conveyor 22 also includes the second pivotal mounting means 52 and the linkage 88 connected to the midportion of the side plates 89. FIG. 4 shows a vertical link 90 connected to a side plate 89 with its lower end connected to a bar 91 pivoted to frame 35 and threadedly connected for vertical movement by the hand wheel 92. A transverse member (not shown) is preferably connected to the bar 91 to actuate a similar system connected to the other side plate 89 for smooth action.

In use, as shown in FIG. 1, the full longitudinal length of the lifting zone is used to depan loaves of bread. When delicate bakery products are to be depanned, the vacuum control means 28 is adjusted to shut off the suction at the downstream end portion of the lifting zone. In the showing in FIG. 2, valve 28 has been closed, thereby shutting off suction in the downstream section 27. Since hamburger rolls 19 are being depanned, the pickup conveyor 20 and discharge conveyor 22 are swung downwardly through the adjusting means 32, the pickup conveyor 20 being swung downwardly by operation of handle 60 to lower its upstream end and the discharge conveyor 22 being swung downwardly by operation of the hand wheel 92 for lowering its upstream end 25. The positioning means 82 is also adjusted to extend the upstream end 25 of the discharge conveyor 22 a distance of about 7 inches so that it is coordinated with the lifting zone and in position to receive rolls released from the pickup conveyor. To enable this adjustability of the operating units of the apparatus for loaves and rolls, it has been found advantageous that the upstream portion of the lifting zone, as defined by the lower flight of the pickup conveyor 20, be substantially horizontal at its various adjusted positions, thereby in effect maintaining the pickup conveyor at this location substantially parallel to the feed conveyor 15. The pickup conveyor 20 then diverges from the horizontal feed conveyor 15, providing the required vertical spacing for pan discharge on the feed conveyor 15 and transfer of the bakery product to the discharge conveyor 22. The upstream end 25 of the endless discharge conveyor 22 preferably is proble-like, having an overall vertical dimension of about 2 inches. The pivotal mounting means 52 for the discharge conveyor 22 is about 2½ feet from the upstream end 25 thereof and the positioning means 82 provides an extension and retraction range of about 7 inches for the upstream end 25. The pickup conveyor 20 has its pivotal mounting means 51 in substantially vertical alignment with the mounting means 52 for the discharge conveyor 22 with the upstream end of the lifting zone being about 5 feet from the mounting means 51. The first pivotal mounting means 51 is spaced about 3 feet vertically from the feed conveyor 20 and the second pivotal mounting means 52 is spaced about 1 foot therefrom. The pickup conveyor swings downwardly about 3 degrees for handling rolls and the discharge conveyor swings downwardly about 6 degrees to handle rolls. Preferably, the lower flight of the pickup conveyor is a segment of a circle having a radius of about 2½ to 3 feet.

While the invention has been described with reference to certain embodiments, they are to be considered illustrative rather that limiting, and it is intended to cover all further embodiments that fall within the spirit and scope of the appended claims.

We claim:

1. In an apparatus for depanning bakery products including rolls and bread,
   a feed conveyor for feeding pans of bakery products,
   an endless pickup conveyor having suction apertures therethrough and a lower flight longitudinally aligned with and positioned above said feed conveyor,
   an endless discharge conveyor having a vertically narrow upstream end longitudinally aligned with and positioned betwen said feed conveyor and the lower flight of said pickup conveyor for receipt of bakery products released from said pickup conveyor,
   vacuum means for producing a suction at the suction apertures along a predetermined length of said lower flight of the pickup conveyor to define a lifting zone and including vacuum control means for enabling the control of the suction at the downstream end portion of said lifting zone to regulate the effective longitudinal lifting length of the lifting zone, said feed conveyor and the lower flight of said pickup conveyor at said lifting zone extending downstream in a vertically diverging relationship, adjusting means for adjusting the vertical orientation of the feed conveyor, pickup conveyor and discharge conveyor to accommodate panned bakery products of different heights such as rolls and bread, and positioning means for longtitudinally positioning said upstream end of said discharge conveyor at various intermediate longitudinal locations along said lifting zone coordinated with said effective longitudinal lifting length of the lifting zone to enable receipt thereon of released bakery products from said pickup conveyor.

2. In an apparatus as defined in claim 1 and wherein said vacuum means includes an upstream section and a downstream section and wherein said vacuum control means includes a valve for shutting off the suction at the downstream section to thereby reduce the lifting length of the lifting zone.

3. In an apparatus as defined in claim 2 and wherein said adjusting means includes first pivotal mounting means for said pickup conveyor and second pivotal mounting means for said discharge conveyor for enabling arcuate movement of their upstream ends for adjusting said vertical orientation.

4. In an apparatus as defined in claim 3 and wherein said lower flight at said lifting zone is convex and said feed conveyor is substantially horizontal, the convex curvature of said lower flight at substantially the upstream end of said lifting zone being gradual, said feed conveyor being substantially parallel to a tangent to said convex curvature at various adjusted positions.

5. In an apparatus as defined in claim 1 wherein said pickup conveyor includes an endless flat solid belt and wherein said suction apertures include a plurality of spaced holes therethrough, the inner end of each hole having a countersunk seat, a cylindrical adapter having an inner flange seated in the countersunk seat, an intermediate body portion extending through its respective belt hole and an outer flange, a suction cup at each adapter and extending outwardly therefrom and having an inner member sandwiched between said outer flange and said belt.

6. In an apparatus as defined in claim 1 and wherein said suction cup includes a bellows wall.

7. In an apparatus as defined in claim 1 and wherein said adjusting means includes first pivotal mounting means for said pickup conveyor and second pivotal mounting means for said discharge conveyor for enabling arcuate movement of their upstream ends for adjusting said vertical orientation.

8. In an apparatus as defined in claim 7 and including a single power means having positive chain-like drive means operatively connected to said discharge conveyor and said pickup conveyor at their respective pivotal mounting means whereby adjustments by said adjusting means do not affect the synchronization and setting of said chain-like means.

9. In an apparatus as defined in claim 8 and wherein the upstream end of the lifting zone of said pickup conveyor is about 5 feet from said first pivotal mounting means, said upstream end of said discharge conveyor is about 2½ feet from said second pivotal mounting means and has a vertical dimension of about 2 inches and said positioning means provides an extension and retraction range of about 7 inches, said first pivotal mounting means is about 3 feet above said feed conveyor, said second pivotal mounting means is about 1 foot above said feed conveyor, said pickup conveyor is adjustable through an arcuate range of about 3 degrees to handle bread and rolls and said discharge conveyor is adjustable through an arcuate range of about 6 degrees to handle bread and rolls, the lower flight of said pickup conveyor at said lifting zone having a convex curvature substantially equivalent to an arc of a circle having about a 2½ foot radius.

10. In an apparatus as defined in claim 9 and wherein said suction apertures are provided by suction cups including a bellows wall.

References Cited

UNITED STATES PATENTS

| | | | |
|---|---|---|---|
| 3,099,360 | 7/1963 | Petersen et al. | 214—309 |
| 3,170,581 | 2/1965 | Temple | 214—309 |
| 3,279,634 | 10/1966 | Temple | 214—309 |

HUGO O. SCHULZ, *Primary Examiner.*